US012197166B2

(12) United States Patent
Nakamura et al.

(10) Patent No.: US 12,197,166 B2
(45) Date of Patent: *Jan. 14, 2025

(54) IMAGE FORMING APPARATUS

(71) Applicant: BROTHER KOGYO KABUSHIKI KAISHA, Nagoya (JP)

(72) Inventors: Kazutoshi Nakamura, Kuwana (JP); Yasuo Fukamachi, Nagoya (JP); Masaaki Furukawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,673

(22) Filed: Aug. 3, 2023

(65) Prior Publication Data

US 2024/0027951 A1 Jan. 25, 2024

Related U.S. Application Data

(63) Continuation of application No. 17/591,278, filed on Feb. 2, 2022, now Pat. No. 11,740,583, which is a (Continued)

(30) Foreign Application Priority Data

Sep. 28, 2018 (JP) ................................ 2018-184040

(51) Int. Cl.
*G03G 21/16* (2006.01)

(52) U.S. Cl.
CPC ..... *G03G 21/1647* (2013.01); *G03G 21/1671* (2013.01); *G03G 21/1676* (2013.01)

(58) Field of Classification Search
CPC ........... G03G 21/1671; G03G 21/1676; G03G 15/0872; G03G 21/185; G03G 2215/0665
See application file for complete search history.

(56) References Cited

U.S. PATENT DOCUMENTS 11,249,438 B2 * 2/2022 Nakamura ......... G03G 21/1647
11,740,583 B2 * 8/2023 Nakamura ......... G03G 21/1647 399/110

(Continued)

FOREIGN PATENT DOCUMENTS

JP 2005-338180 A 12/2005
JP 2006-18126 A 1/2006

(Continued)

OTHER PUBLICATIONS

International Search report in App PCT/JP2019/022497 (Year: 2020).

(Continued)

*Primary Examiner* — Sevan A Aydin
(74) *Attorney, Agent, or Firm* — Merchant & Gould P.C.

(57) ABSTRACT

An image forming apparatus includes a main casing, a drum cartridge and a developing cartridge. The drum cartridge may include a first handle positioned at a first end of a frame of the drum cartridge. The developing cartridge may include a second handle positioned at a first end of a developing casing the developing cartridge. The main casing may include a first edge surface in the axial direction and a second edge surface opposite the first edge surface in the axial direction. The second handle may extend farther from the second edge surface than the first handle extends from the second edge surface in the axial direction in a state where the drum cartridge and the developing cartridge are attached to the main casing.

14 Claims, 10 Drawing Sheets

Related U.S. Application Data continuation of application No. 17/117,419, filed on Dec. 10, 2020, now Pat. No. 11,249,438, which is a continuation of application No. 16/803,329, filed on Feb. 27, 2020, now Pat. No. 10,866,557, which is a continuation of application No. PCT/JP2019/022497, filed on Jun. 6, 2019.

(56) References Cited

U.S. PATENT DOCUMENTS

| | | | |
|---|---|---|---|
| 2004/0184835 | A1 | 9/2004 | Park |
| 2007/0059037 | A1 | 3/2007 | Hirai |
| 2007/0104505 | A1 | 5/2007 | Murakami et al. |
| 2010/0080622 | A1 | 4/2010 | Uchida |
| 2013/0170855 | A1 | 7/2013 | Mori et al. |
| 2014/0205315 | A1 | 7/2014 | Jang et al. |
| 2015/0139690 | A1 | 5/2015 | Kim et al. |
| 2017/0023878 | A1 | 1/2017 | Uchida et al. |
| 2018/0120758 | A1 | 5/2018 | Zensai et al. |
| 2018/0120763 | A1 | 5/2018 | Takano et al. |

FOREIGN PATENT DOCUMENTS

| | | | |
|---|---|---|---|
| JP | 2006-154500 | A | 6/2006 |
| JP | 2010-102303 | A | 5/2010 |
| JP | 2013-137425 | A | 7/2013 |
| JP | 2013-182103 | A | 9/2013 |
| JP | 2013-257490 | A | 12/2013 |
| JP | 2018-49198 | A | 3/2018 |
| JP | 2018-72677 | A | 5/2018 |
| JP | 2018-77459 | A | 5/2018 |

OTHER PUBLICATIONS

Written Opinion issued in related International Patent Application No. PCT/JP2019/022497, Jul. 16, 2019.

International Search Report issued in related International Patent Application No. PCT/JP2019/022497, Jul. 16, 2019.

Office Action (Notice of Reasons for Refusal) issued in corresponding Japanese Patent Application No. 2022-171067, Oct. 3, 2023.

* cited by examiner

IMAGE FORMING APPARATUS

CROSS-REFERENCE TO RELATED APPLICATIONS

This is a continuation of U.S. patent application Ser. No. 17/591,278, filed Feb. 2, 2022, which is a continuation of U.S. patent application Ser. No. 17/117,419, filed Dec. 10, 2020, now U.S. Pat. No. 11,249,438, which is a continuation of U.S. patent application Ser. No. 16/803,329, filed Feb. 27, 2020, now U.S. Pat. No. 10,866,557, which is a continuation of International Application No. PCT/JP2019/022497 filed on Jun. 6, 2019, which claims priority from Japanese Patent Application No. 2018-184040 filed on Sep. 28, 2018. The entire contents of the earlier applications are incorporated herein by reference.

TECHNICAL FIELD

Aspects of the disclosure relate to an image forming apparatus including a drum cartridge and a developing cartridge, each of which is removably insertable to a main body casing of the image forming apparatus.

BACKGROUND

Some known image forming apparatus is configured such that a drum cartridge and a developing cartridge are each insertable into and removable from a main body casing of the image forming apparatus in an axial direction extending parallel to a rotation axis of a photosensitive drum. Such a drum cartridge and a developing cartridge are individually insertable into and removable from the main body casing, respectively. The drum cartridge and the developing cartridge each include a handle at one of side surfaces thereof in the axial direction. Each handle may be held by a user. A user may pull the drum cartridge and the developing cartridge individually by holding the respective handles with fingers.

SUMMARY

A developing cartridge may be replaced at higher frequency than a drum cartridge. In a case where a drum cartridge and a developing cartridge are insertable into or removable from the main body casing in the axial direction, a simple easy step may be required for removal of a developing cartridge more frequently replaced than the drum cartridge.

Accordingly, aspects of the disclosure provide an image forming apparatus including a drum cartridge and a developing cartridge, each of which is removably insertable to a main body casing of the image forming apparatus, and having a configuration that may enable the developing cartridge to be easily removed from the main body casing prior to the drum cartridge.

DETAILED DESCRIPTION

A first illustrative embodiment will be described with reference to the accompanying drawings.

Figure 1:
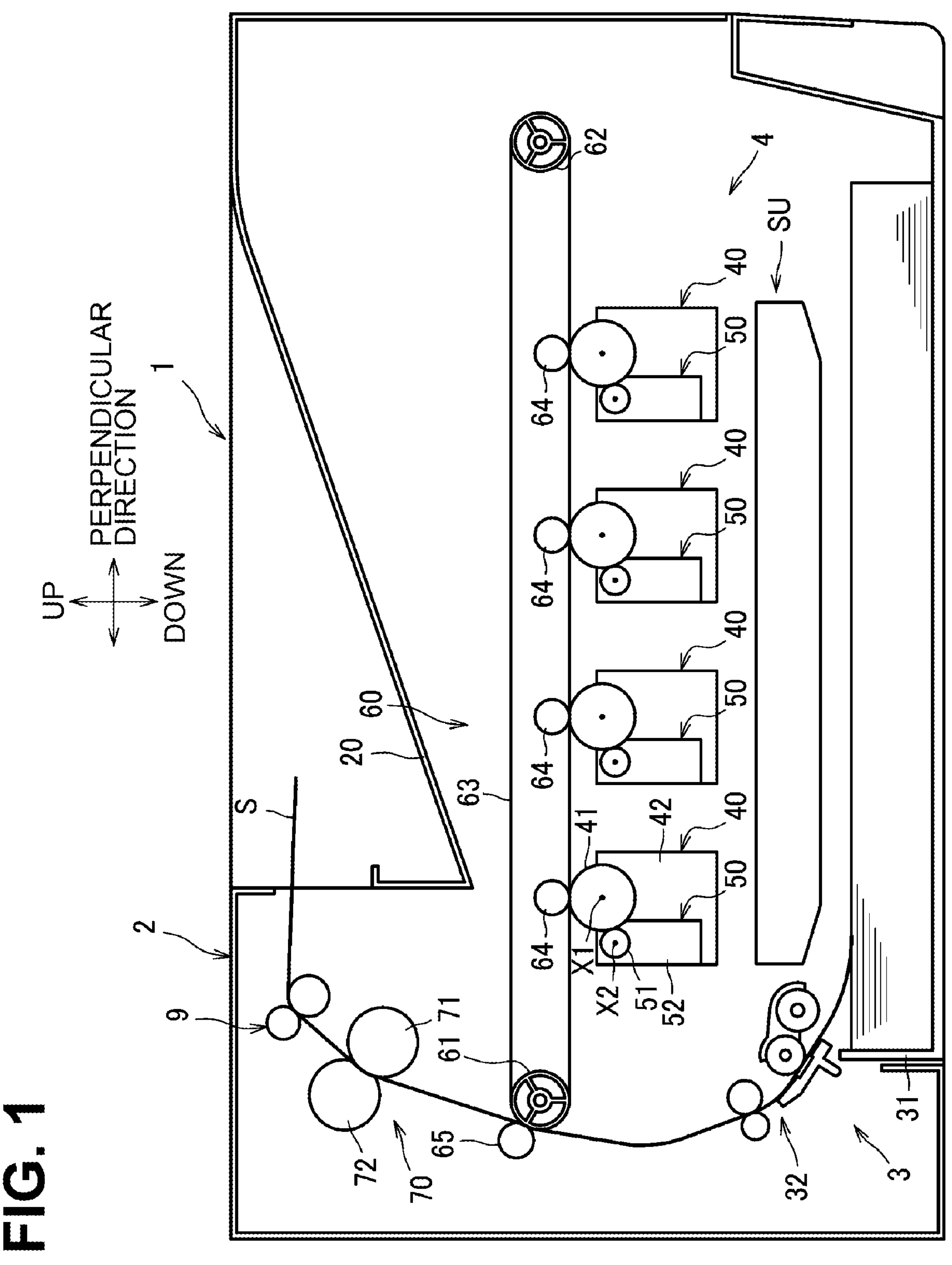
FIG. 1 illustrates a general configuration of an image forming apparatus according to a first illustrative embodiment of the disclosure.

As illustrated in FIG. 1, an image forming apparatus 1 may be a color printer. The image forming apparatus 1 includes a main body casing 2, a feed unit 3, an image forming unit 4, and discharge rollers 9. The feed unit 3 is configured to feed a sheet S to the image forming unit 4. The image forming unit 4 is configured to form an image onto a sheet S. The discharge rollers 9 are configured to convey a sheet S to discharge the sheet S to the outside of the main body casing 2.

The main body casing 2 includes a sheet receiving portion 20 at its top. The sheet receiving portion 20 is configured to receive a discharged sheet S. The sheet receiving portion 20 is positioned above an intermediate transfer belt 63.

The feed unit 3 is positioned in a lower portion of the main body casing 2. The feed unit 3 includes a feed tray 31 and a feed mechanism 32. The feed tray 31 is insertable into and removable from the main body casing 2. The feed mechanism 32 is configured to feed a sheet S from the feed tray 31 to the image forming unit 4.

The image forming unit 4 includes a plurality of drum cartridges 40, a plurality of developing cartridges 50, an exposure device SU, a transfer unit 60, and a fixing unit 70. The number of drum cartridges 40 and the number of the developing cartridges 50 each correspond to the number of toner colors. In the first illustrative embodiment, for example, the drum cartridges 40 may include four drum cartridges 40 and the developing cartridges 50 may include four developing cartridges 50. The drum cartridges 40 and the developing cartridges 50 are arranged side by side in the image forming unit 4.

Figure 3:
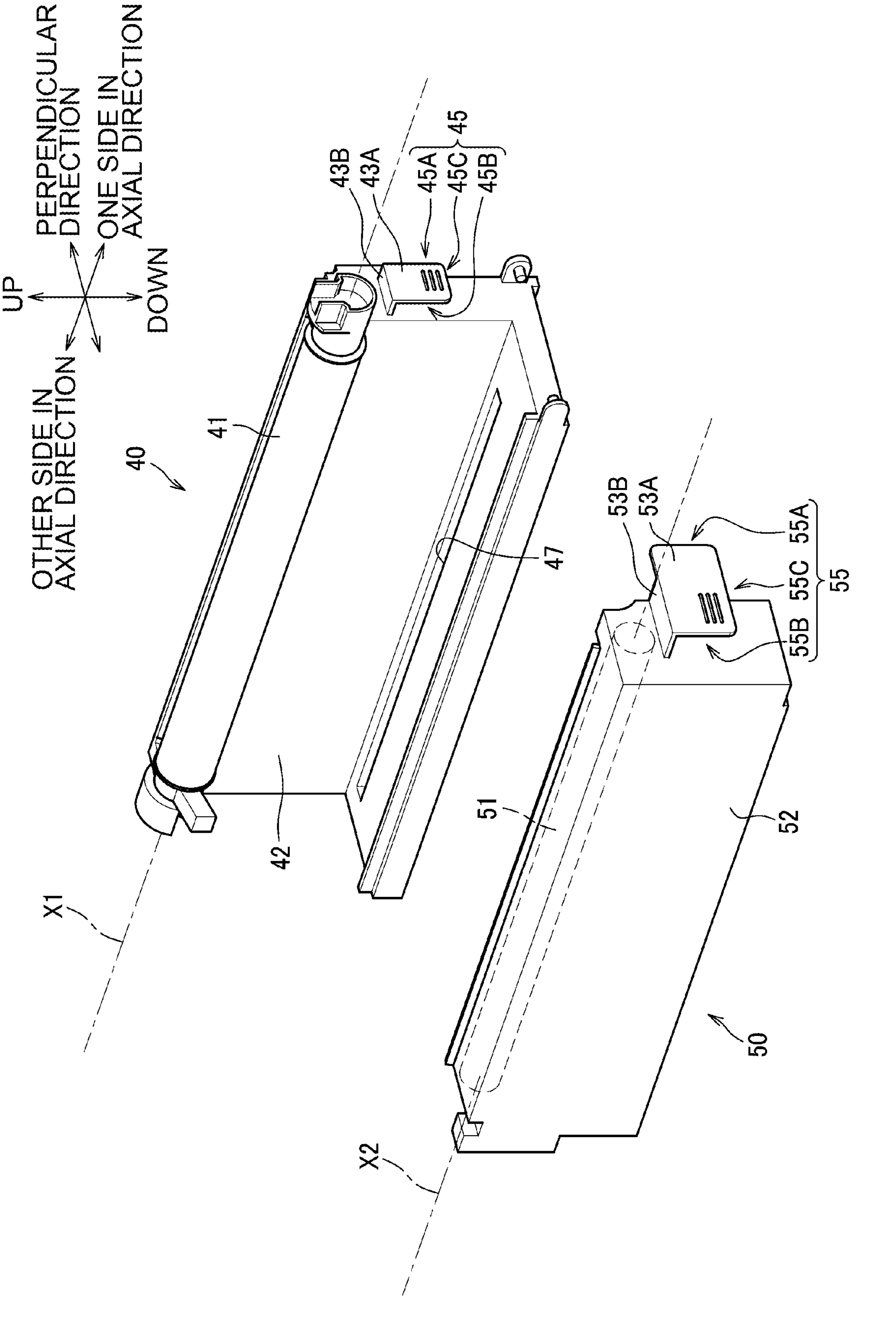
FIG. 3 is a perspective view illustrating a developing cartridge and a drum cartridge according to the first illustrative embodiment.

Each drum cartridge 40 includes a photosensitive drum 41, a frame 42, and a charger. The photosensitive drum 41 is rotatable about a first axis X1 extending in an axial direction. The photosensitive drums 41 are arranged in a direction perpendicular to both of the axial direction and an up-down direction (hereinafter, simply referred to as the perpendicular direction). The frame 42 supports the photosensitive drum 41 rotatably. The drum cartridges 40 are individually insertable into and removable from the main body casing 2 in the axial direction. As illustrated in FIG. 3, the frame 42 has a slit 47. The slit 47 penetrates the frame 42. The slit 47 is configured to allow a laser beam emitted by the exposure device SU to pass therethrough such that the laser beam reaches a circumferential surface of a corresponding photosensitive drum 41.

As illustrated in FIG. 1, in a state where the drum cartridges 40 and the developing cartridges 50 are attached to the main body casing 2, the drum cartridges 40 and the developing cartridges 50 are alternately arranged in the perpendicular direction.

The developing cartridges 50 store toner of respective different colors. Each developing cartridge 50 includes a developing roller 51 and a developing casing 52. The developing roller 51 is rotatable about a second axis X2 extending in the axial direction. The developing casing 52 stores toner of a corresponding color. The developing rollers 51 are arranged in the perpendicular direction. The developing cartridges 50 are individually insertable into and removable from the main body casing 2 in the axial direction.

The exposure device SU is positioned below the drum cartridges 40. The exposure device SU is configured to irradiate a circumferential surface of each photosensitive drum 41 with a laser beam.

The transfer unit 60 is positioned between the photosensitive drums 41 and the sheet receiving portion 20 in the up-down direction. The transfer unit 60 includes a drive roller 61, a driven roller 62, the intermediate transfer belt 63, a plurality of, for example, four, first transfer rollers 64, and a second transfer roller 65.

The intermediate transfer belt 63 may be an endless belt. In a state where the drum cartridges 40 and the developing cartridges 50 are attached to the main body casing 2, the intermediate transfer belt 63 is positioned above the drum cartridges 40 and the developing cartridges 50. In such a state, the intermediate transfer belt 63 contacts the circumferential surface of each photosensitive drum 41. The intermediate transfer belt 63 is looped over the drive roller 61 and the driven roller 62.

The first transfer rollers 64 are positioned inside the loop of the intermediate transfer belt 63. The first transfer rollers 64 and the respective corresponding photosensitive drums 41 sandwich the intermediate transfer belt 63 therebetween.

The second transfer roller 65 is positioned outside the loop of the intermediate transfer belt 63. The second transfer roller 65 and the drive roller 61 sandwich the intermediate transfer belt 63 therebetween.

The fixing unit 70 is positioned above the intermediate transfer belt 63. The fixing unit 70 includes a heat roller 71 and a pressure roller 72. The pressure roller 72 is configured to be pressed toward the heat roller 71.

In the image forming unit 4, first, the charger charges the circumferential surface of each photosensitive drum 41. Thereafter, the exposure device SU exposes the circumferential surface of each photosensitive drum 41. Thus, an electrostatic latent image is formed on the circumferential surface of each photosensitive drum 41.

After that, each developing roller 51 supplies toner onto the electrostatic latent image formed on a corresponding photosensitive drum 41, thereby forming a toner image on the circumferential surface of each photosensitive drum 41. Each first transfer roller 64 then transfers the toner image onto an outer circumferential surface of the intermediate transfer belt 63 from the circumferential surface of the corresponding photosensitive drum 41.

When a sheet S passes between the intermediate transfer belt 63 and the second transfer roller 65, the second transfer roller 65 transfers the overlapping toner images onto the sheet S from the outer circumferential surface of the intermediate transfer belt 63. Thereafter, the fixing unit 70 fixes the transferred toner images onto the sheet S. The discharge rollers 9 then convey the sheet S to discharge the sheet S to the sheet receiving portion 20.

Figure 2:
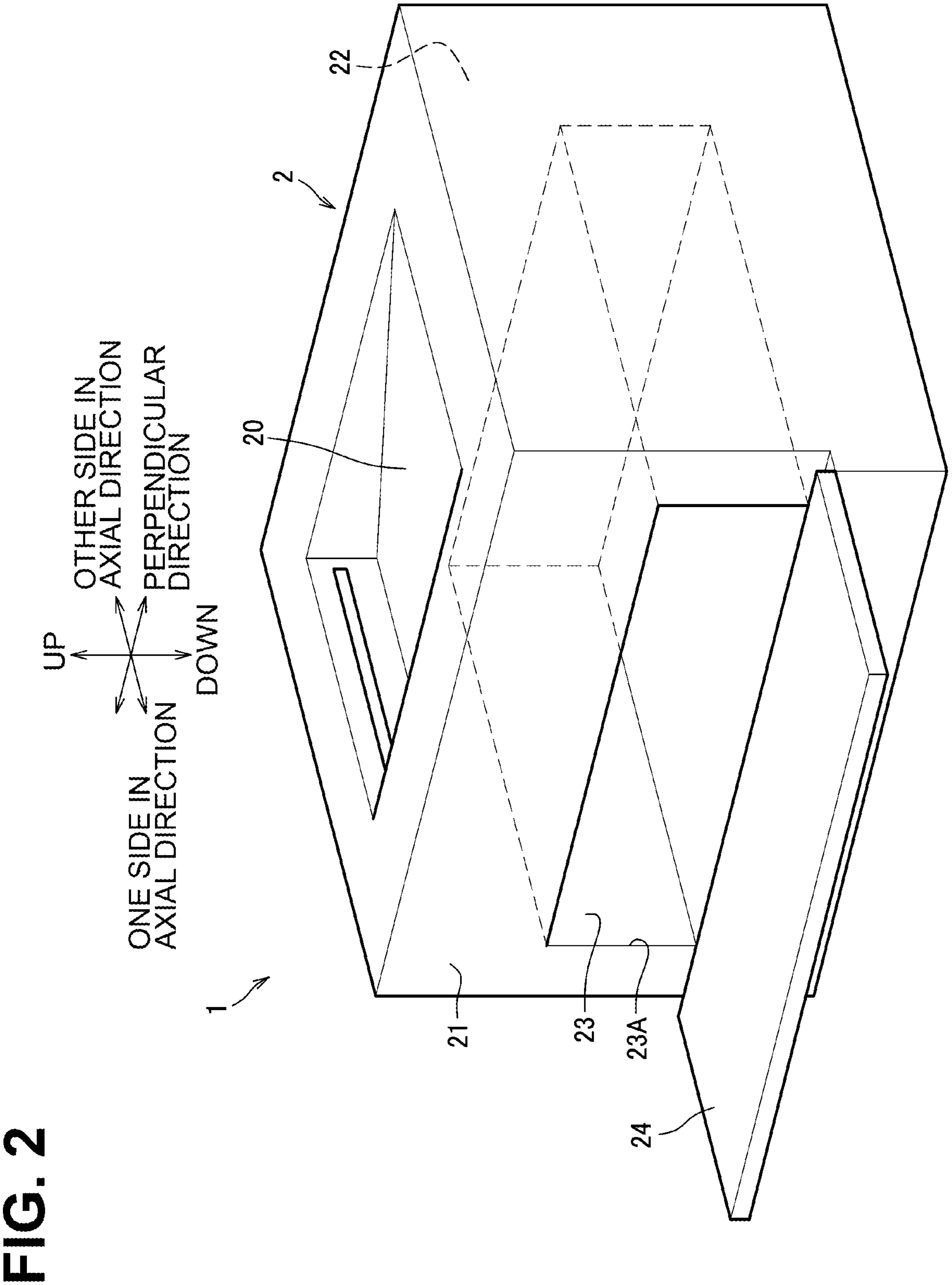
FIG. 2 is a perspective view of the image forming apparatus with a cover of a main body casing of the image forming apparatus opened.

As illustrated in FIG. 2, the main body casing 2 includes a first end face 21, a second end face 22, a slot 23, and a cover 24.

The first end face 21 may be a one-side end of the main body casing 2 in the axial direction. The second end face 22 may be an other-side end of the main body casing 2 in the axial direction. The second end face 22 faces the first end face 21 in the axial direction.

The slot 23 extends from the first end face 21 toward the second end face 22. The slot 23 is configured to allow respective drum cartridges 40 to be inserted thereinto and removed therefrom in the axial direction. The slot 23 is further configured to allow respective developing cartridges 50 to be inserted thereinto and removed therefrom in the axial direction. The slot 23 has an opening 23A that allows the drum cartridges 40 and the developing cartridges 50 individually to be inserted into the slot 23 and removed from the slot 23.

The cover 24 is configured to cover and uncover the opening 23A of the slot 23.

All of the drum cartridges 40 may have the same or similar configuration and function in the same or similar manner, and all of the developing cartridges 50 have the same or similar configuration and function in the same or similar manner. In the description below, therefore, one of the drum cartridges 40 and one of the developing cartridges 50 will be described in detail and a description for the others will be omitted. As illustrated in FIG. 3, a drum cartridge 40 includes a first handle 43A. The first handle 43A is positioned at an outer surface of one of ends of the frame 42 in the axial direction. The first handle 43A has a rectangular plate shape. The first handle 43A is spaced from the outer surface of the frame 42 by a certain distance in the axial direction. The drum cartridge 40 further includes a first connecting portion 43B. The first connecting portion 43B may connect between the outer surface of the frame 42 in the axial direction and one end of the first handle 43A in an up-down direction.

The first handle 43A may have a first port 45. Alternatively, the first handle 43A may have an opening. The first port 45 is defined between the outer surface of the frame 42 in the axial direction and the first handle 43A. At least one of sides of the first port 45 may open to the first axis X1 in a direction D1 in which the first axis X1 and the second axis X2 are arranged side by side (refer to FIG. 5). In the first illustrative embodiment, three sides of the first port 45 may open to respective sides. More specifically, for example, one of the sides of the first port 45 may open to the first axis X1 in the direction D1 (e.g., a first access 45A), another of the sides of the first port 45 may open to the second axis X2 in the direction D1 (e.g., a first access 45B), and another of the sides of the first port 45 may open downward (e.g., a first access 45C).

The first port 45 allows a user to hook a finger on the first handle 43A. A user may thus be enabled to hook a finger on the first handle 43A of the drum cartridge 40 via the first port 45 and pull the drum cartridge 40 from the main body casing 2 using the first handle 43A.

A developing cartridge 50 includes a second handle 53A. The second handle 53A is positioned at an outer surface of one of ends of the developing casing 52 in the axial direction. The second handle 53A has a rectangular plate shape. The second handle 53A is spaced from the outer surface of the developing casing 52 by a certain distance in the axial direction. The developing cartridge 50 further includes a second connecting portion 53B. The second connecting portion 53B may connect between the outer surface of the developing casing 52 in the axial direction and one end of the second handle 53A in the up-down direction.

The second handle 53A may have a second port 55. Alternatively, the second handle 53A may have an opening. The second port 55 is defined between the outer surface of the developing casing 52 in the axial direction and the second handle 53A. In the first illustrative embodiment, three sides of the second port 55 may open to respective sides. More specifically, for example, one of the sides of the second port 55 may open to the first axis X1 in the direction D1 (e.g., a second access 55A), another of the sides of the second port 55 may open to the second axis X2 in the direction D1 (e.g., a second access 55B), and another of the side of the second port 55 may open downward (e.g., a second access 55C).

The second port 55 allows a user to hook a finger on the second handle 53A. A user may thus be enabled to hook a finger on the second handle 53A of the developing cartridge 50 via the second port 55 and pull the developing cartridge 50 from the main body casing 2 using the second handle 53A.

Figure 4:
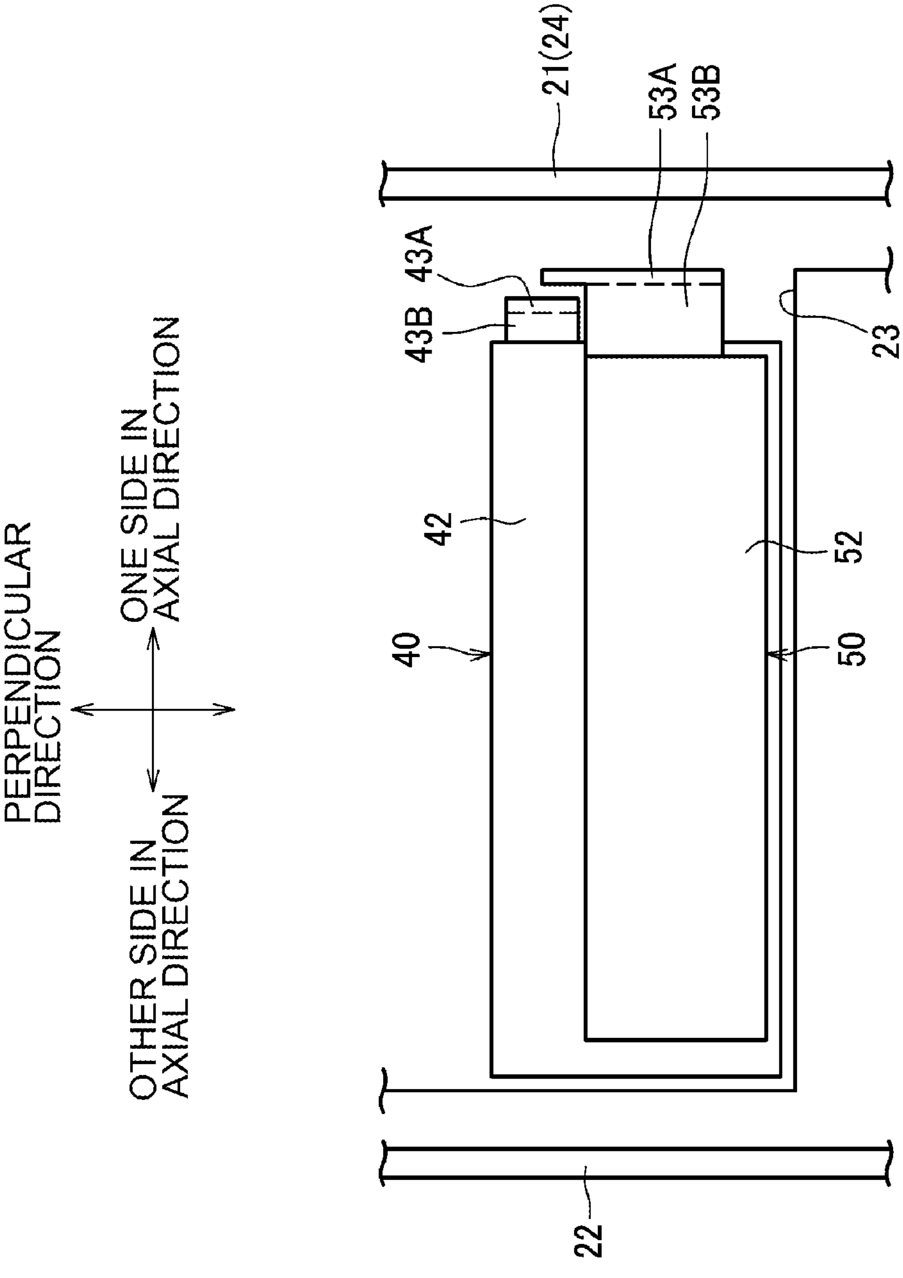
FIG. 4 is an upper perspective view of a drum cartridge and a corresponding developing cartridge attached to the main body casing according to the first illustrative embodiment.
Figure 5:
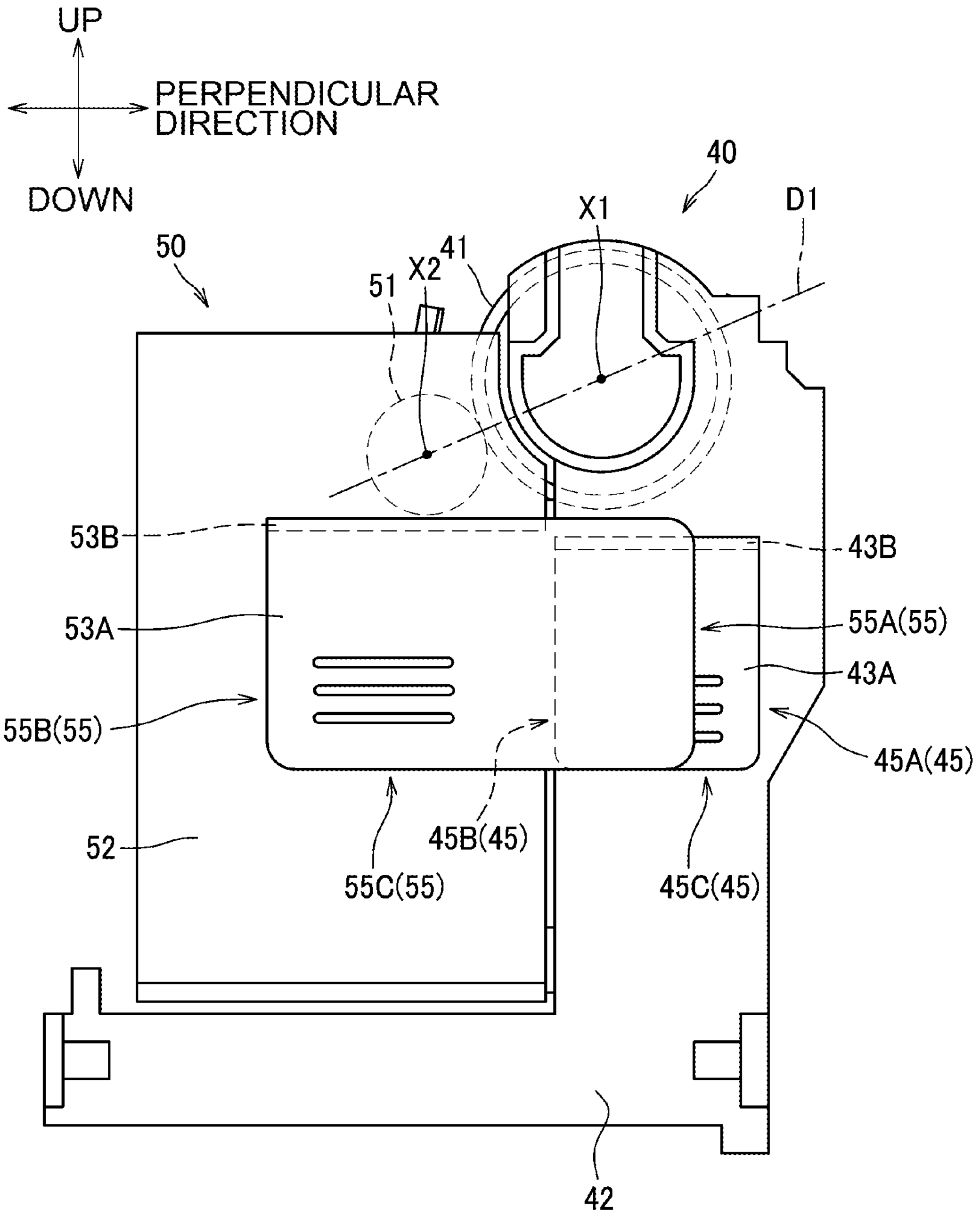
FIG. 5 is a side perspective view of a drum cartridge and a corresponding developing cartridge attached to the main body casing when viewed from a cover side according to the first illustrative embodiment.

As illustrated in FIG. 4, in a state where the drum cartridge 40 and the developing cartridge 50 are attached to the main body casing 2, the first handle 43A and the second handle 53A are exposed from the slot 23. In a state where the drum cartridge 40 and the developing cartridge 50 are attached to the main body casing 2, the second handle 53A is farther from the second end face 22 than the first handle 43A from the second end face 22 in the axial direction. A portion of the first handle 43A and a portion of the second handle 53A are arranged one behind another in the axial direction. That is, as illustrated in FIG. 5, the portion of the first handle 43A and the portion of the second handle 53A overlap each other when viewed in the axial direction.

Hereinafter, a description will be provided on insertion and removal procedures for a drum cartridge 40 and a developing cartridge 50, respectively, and the description may alto apply to the others.

In a case where the cover 24 is opened in a state where the drum cartridge 40 and the developing cartridge 50 are attached to the main body casing 2, as illustrated in FIG. 4, the first handle 43A and the second handle 53A are caused to be exposed from the slot 23.

Figure 6A:
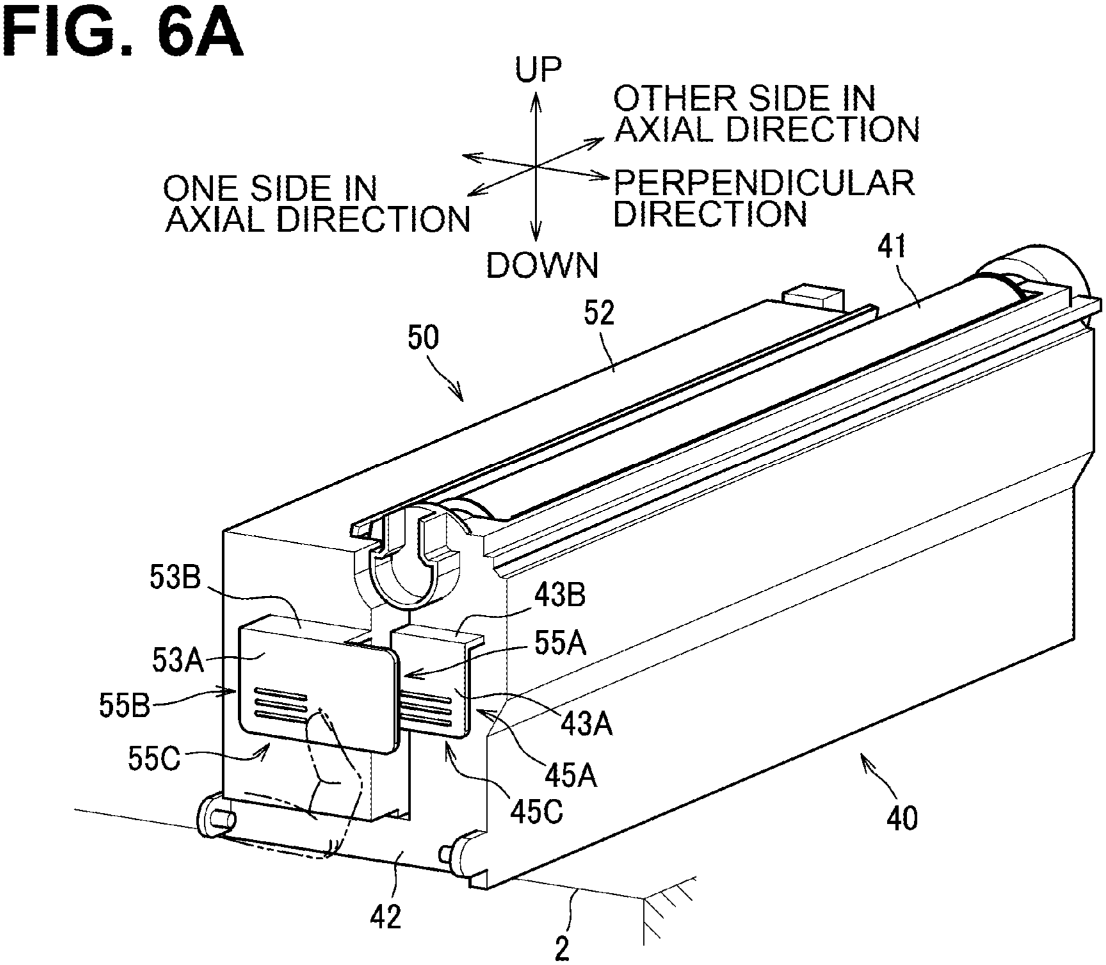
FIG. 6A is a perspective view illustrating how to pull out a developing cartridge according to the first illustrative embodiment.

For pulling out the developing cartridge 50 from the main body casing 2, as illustrated in FIG. 6A, a user places a finger in the second port 55 and pulls the second handle 53A of the developing cartridge 50. Thus, only the developing cartridge 50 is pulled out from the main body casing 2 and a corresponding drum cartridge 40 might not be pulled out from the main body casing 2.

As described above, in a case where the second handle 53A is pulled in the axial direction in a state where the drum cartridge 40 and the developing cartridge 50 are attached to the main body casing 2, only the developing cartridge 50 is pulled out from the main body casing 2.

Figure 6B:
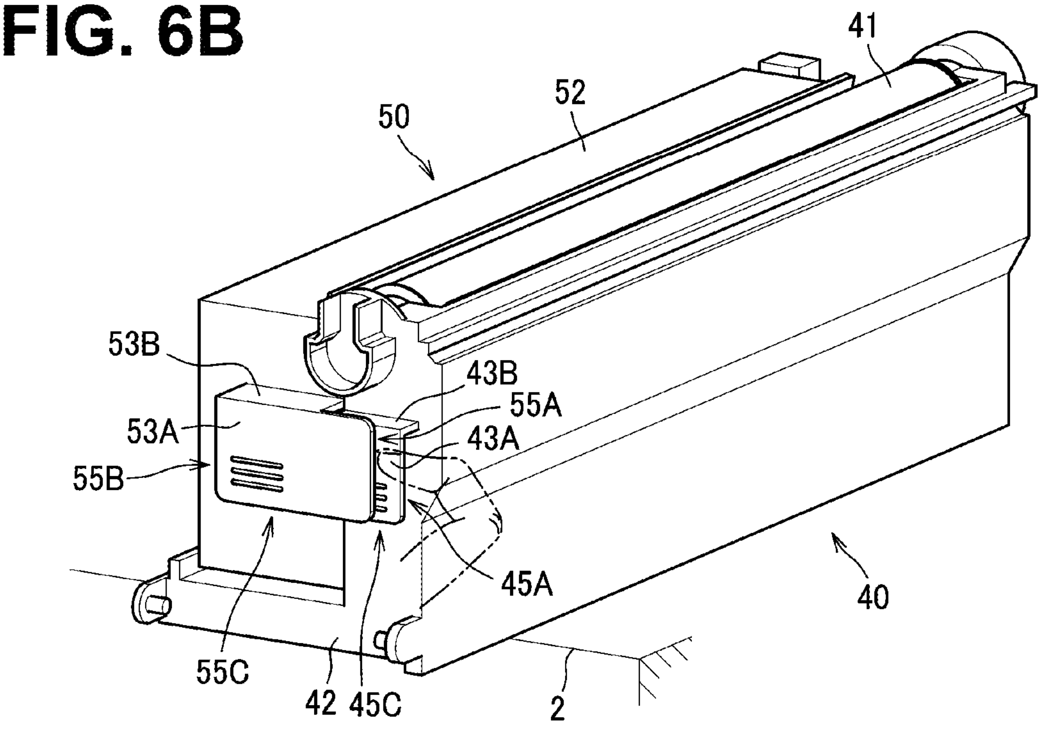
FIG. 6B is a perspective view illustrating how to pull out a drum cartridge according to the first illustrative embodiment.

For pulling out the drum cartridge 40 from the main body casing 2, as illustrated in FIG. 6B, a user places a finger in the first port 45 and pulls the first handle 43A of the drum cartridge 40. Thus, the first handle 43A contacts a corresponding second handle 53A. In response to the user further pulling the first handle 43A after the first handle 43A contacts the second handle 53A, the first handle 43A presses the second handle 53A. The developing cartridge 50 corresponding to the drum cartridge 40 is thus pulled out from the main body casing 2 together with the drum cartridge 40.

As described above, in a case where the first handle 43A is pulled in the axial direction in a state where the drum cartridge 40 and the developing cartridge 50 are attached to the main body casing 2, the first handle 43A contacts a corresponding second handle 53A. In response to the first handle 43A contacting the second handle 53A, the drum cartridge 40 is pulled out from the main body casing 2 in the axial direction and the corresponding developing cartridge 50 is also pulled out from the main body casing 2 in the axial direction.

For attaching the drum cartridge 40 and the corresponding developing cartridge 50 to the main body casing 2, it may be preferable that the drum cartridge 40 be inserted into the main body casing 2 prior to the developing cartridge 50.

According to the image forming apparatus 1 of the first illustrative embodiment, in a state where the drum cartridge 40 and the developing cartridge 50 are attached to the main body casing 2, the second handle 53A is farther from the second end face 22 than the first handle 43A from the second end face 22 in the axial direction. Such a configuration may thus enable a user to easily pull out the developing cartridge 50 from the main body casing 2 prior to the corresponding drum cartridge 40.

A portion of the first handle 43A and a portion of the second handle 53A are arranged one behind another in the axial direction. In a case where the second handle 53A is pulled in the axial direction in a state where the drum cartridge 40 and the developing cartridge 50 are attached to the main body casing 2, only the developing cartridge 50 is pulled out from the main body casing 2. In a case where the first handle 43A is pulled in the axial direction in a state where the drum cartridge 40 and the developing cartridge 50 are attached to the main body casing 2, the first handle 43A contacts the second handle 53A of the corresponding developing cartridge 50. Such a configuration may thus cause a user to pull out the developing cartridge 50 prior to the corresponding drum cartridge 40.

In a case where the first handle 43A is pulled in the axial direction for pulling out the drum cartridge 40 from the main body casing 2, the first handle 43A contacts the second handle 53A of the corresponding developing cartridge 53A and the developing cartridge 50 is also pulled out from the main body casing 2 in the axial direction together with the drum cartridge 40. Such a configuration may thus enable a user to pull out both of the drum cartridge 40 and the developing cartridge 50 from the main body casing 2 by pulling the first handle 43A.

The first handle 43A has the first port 45 whose one of the sides may open to the first axis X1 in the direction D1. Consequently, the developing cartridge 50 might not obstruct a user's finger access to the first port 45 of the first handle 43A in a state where both of the drum cartridge 40 and the developing cartridge 50 corresponding to each other are attached to the main body casing 2, thereby enabling a user to hook a finger into the first port 45 easily.

Hereinafter, a second illustrative embodiment will be described. A description will be provided mainly for the components or elements different from the first illustrative embodiment, and a description will be omitted for the common components or elements by assigning the same reference numerals thereto. All drum cartridges 140 may have the same or similar configuration and function in the same or similar manner, and all developing cartridges 150 have the same or similar configuration and function in the same or similar manner. In the description below, therefore, one of the drum cartridges 140 and one of the developing cartridges 150 will be described in detail and a description for the others will be omitted.

Figure 7:
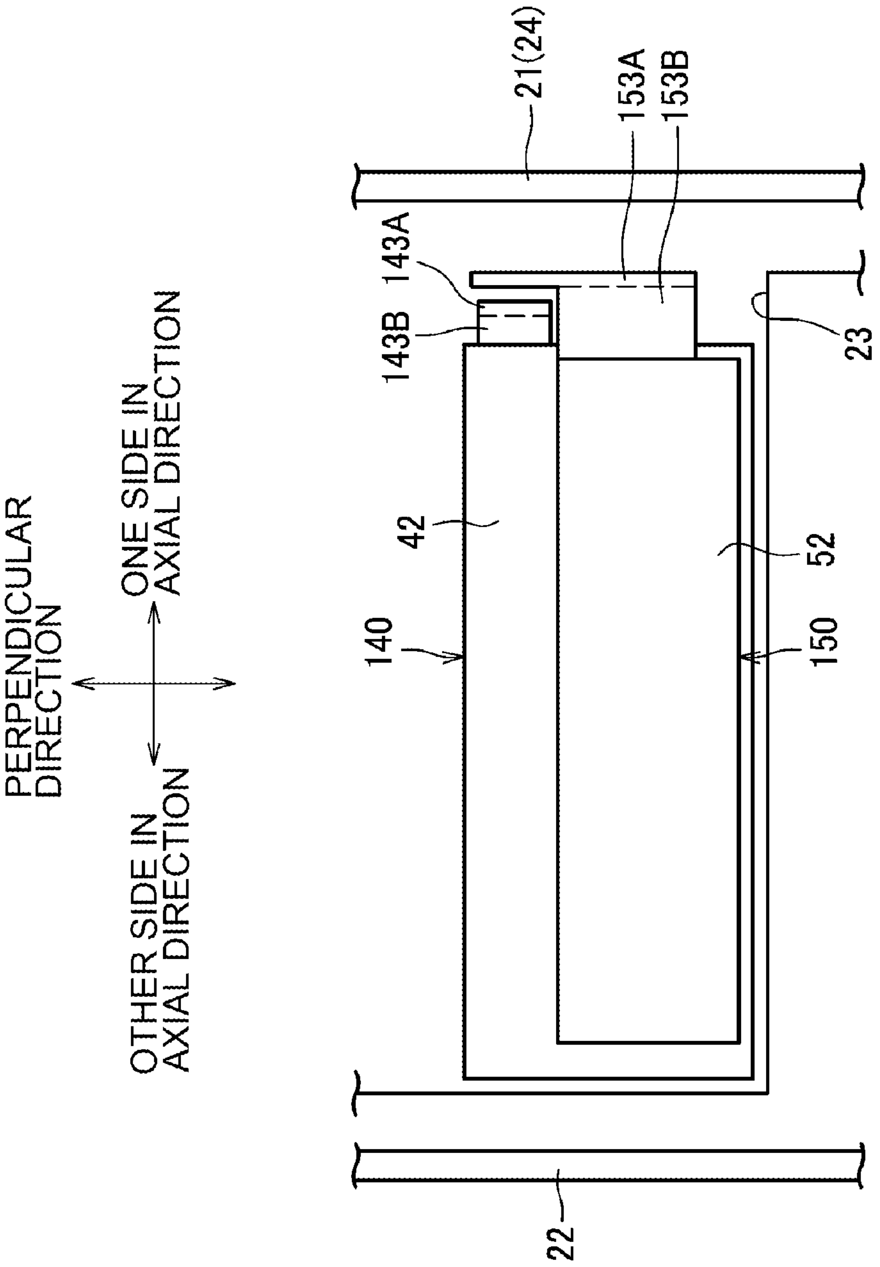
FIG. 7 is an upper perspective view of a drum cartridge and a corresponding developing cartridge attached to a main body casing according to a second illustrative embodiment.
Figure 8:
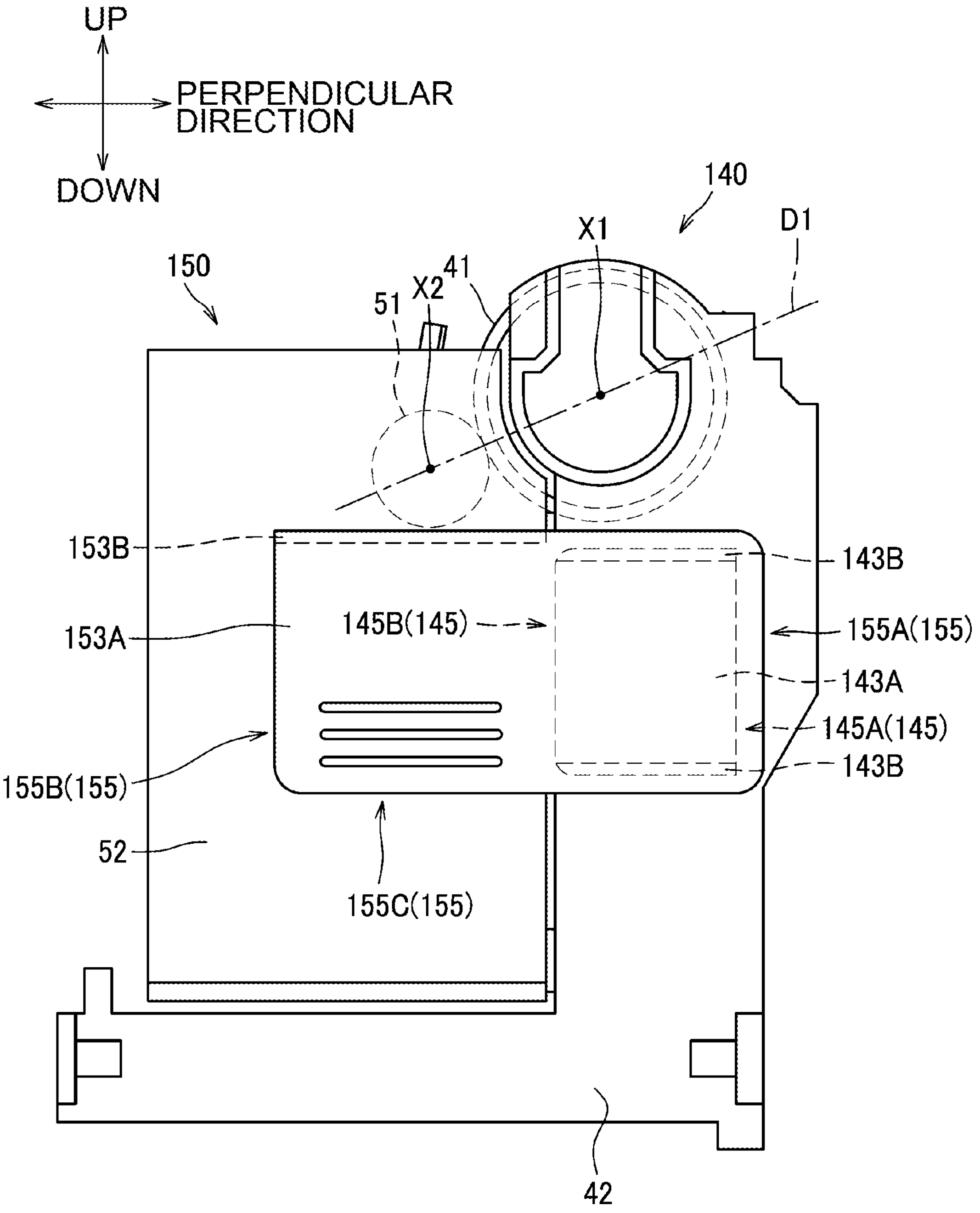
FIG. 8 is a side perspective view of a drum cartridge and a corresponding developing cartridge attached to the main body casing when viewed from a cover side according to the second illustrative embodiment.

In the second illustrative embodiment, as illustrated in FIGS. 7 and 8, a drum cartridge 140 includes a first handle 143A. The first handle 143A is spaced from an outer surface of a frame 42 by a certain distance in the axial direction. The drum cartridge 140 further includes a first connecting portion 143B. The first connecting portion 143B may connect between the outer surface of the frame 42 in the axial direction and the first handle 143A. More specifically, for example, the first connecting portion 143B may connect between one end of the first handle 143A in the up-down direction and the outer surface of the frame 42 in the axial direction. The first connecting portion 143B may also connect between the other end of the first handle 143A in the up-down direction and the outer surface of the frame 42 in the axial direction.

A developing cartridge 150 includes a second handle 153A. The second handle 153A is spaced from an outer surface of a developing casing 52 by a certain distance in the axial direction. The developing cartridge 150 further includes a second connecting portion 153B. The second connecting portion 153B may connect between the outer surface of the developing casing 52 in the axial direction and one end of the second handle 153A in the up-down direction.

The entirety of the first handle 143A and a portion of the second handle 153A are arranged one behind another in the axial direction. When viewed from the cover 24 side (e.g., the one side of the axial direction), the entirety of the first handle 143A overlaps a portion of the second handle 153A.

The first handle 143A may have a first port 145. Alternatively, the first handle 143A may have an opening. The first port 145 allows a user to hook a finger on the first handle 143A. In the second illustrative embodiment, two sides of the first port 145 may open to respective sides. More specifically, for example, one of the sides of the first port 145 may open to the first axis X1 in the direction D1 (e.g., a first access 145A) and another of the sides of the first port 145 may open to the second axis X2 in the direction D1 (e.g., a first access 145B).

Figure 9:
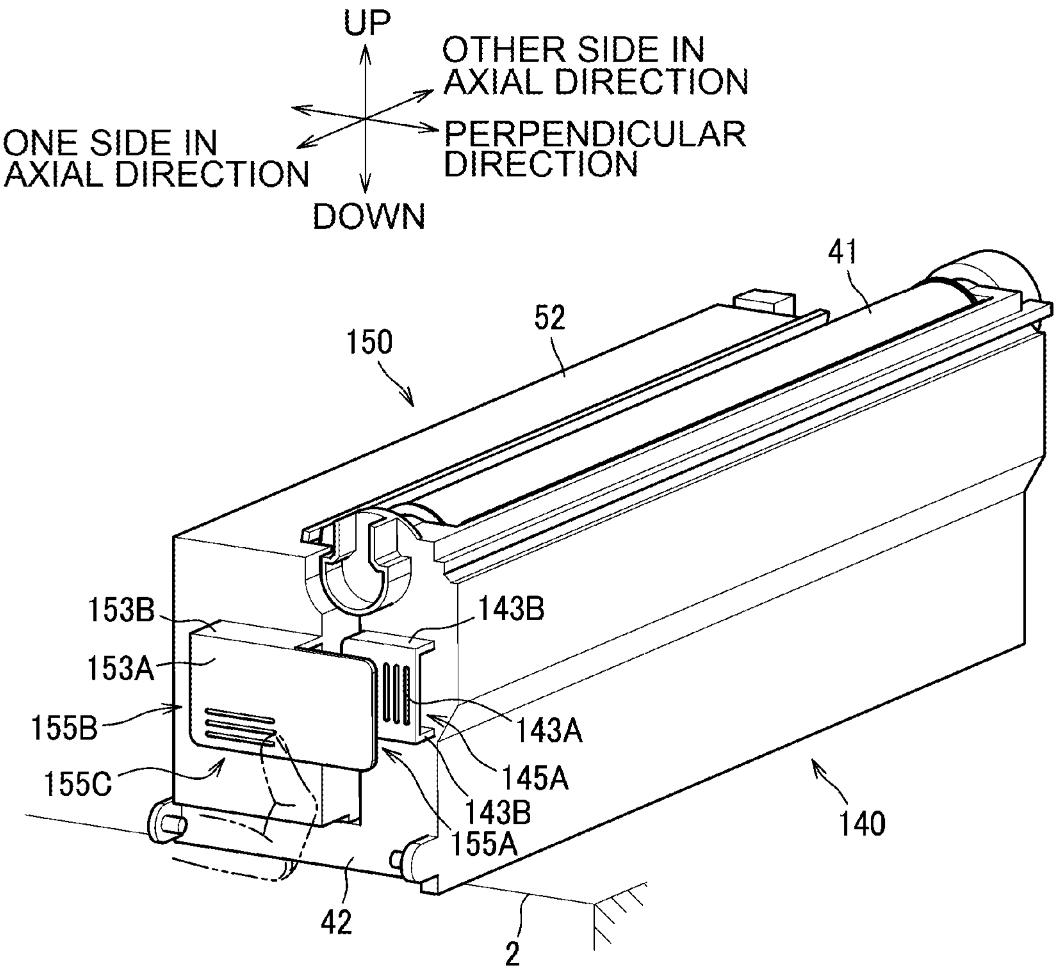
FIG. 9 is a perspective view illustrating how to pull out a developing cartridge according to the second illustrative embodiment.

For pulling out only the developing cartridge 150 from the main body casing 2, as illustrated in FIG. 9, a user places a finger in a second port 155 and pulls the second handle 153A of the developing cartridge 150. Thus, only the developing cartridge 150 is pulled out from the main body casing 2 and the corresponding drum cartridge 140 might not be pulled out from the main body casing 2.

As illustrated in FIG. 8, a user might not see the first handle 143A even if the user desires to pull out the drum cartridge 140 from the main body casing 2. Such a configuration may thus cause the user to pull out the developing cartridge 150 prior to the drum cartridge 140.

Consequently, the configuration according to the second illustrative embodiment may cause a user to pull out the developing cartridge 150 prior to the corresponding drum cartridge 140.

The first handle 143A has the first port 145 whose one of the sides may open to the second axis X2 in the direction D1. That is, the first port 145 opens to the developing cartridge 150. Such a configuration may thus enable a user to easily place a finger in the first port 145 of the drum cartridge 140 after removing the corresponding developing cartridge 150.

Hereinafter, a third illustrative embodiment will be described. A description will be provided mainly for the components or elements different from the first illustrative embodiment, and a description will be omitted for the common components or elements by assigning the same reference numerals thereto. All drum cartridges 240 may have the same or similar configuration and function in the same or similar manner. In the description below, therefore, one of the drum cartridges 240 will be described in detail and a description for the others will be omitted.

Figure 10:
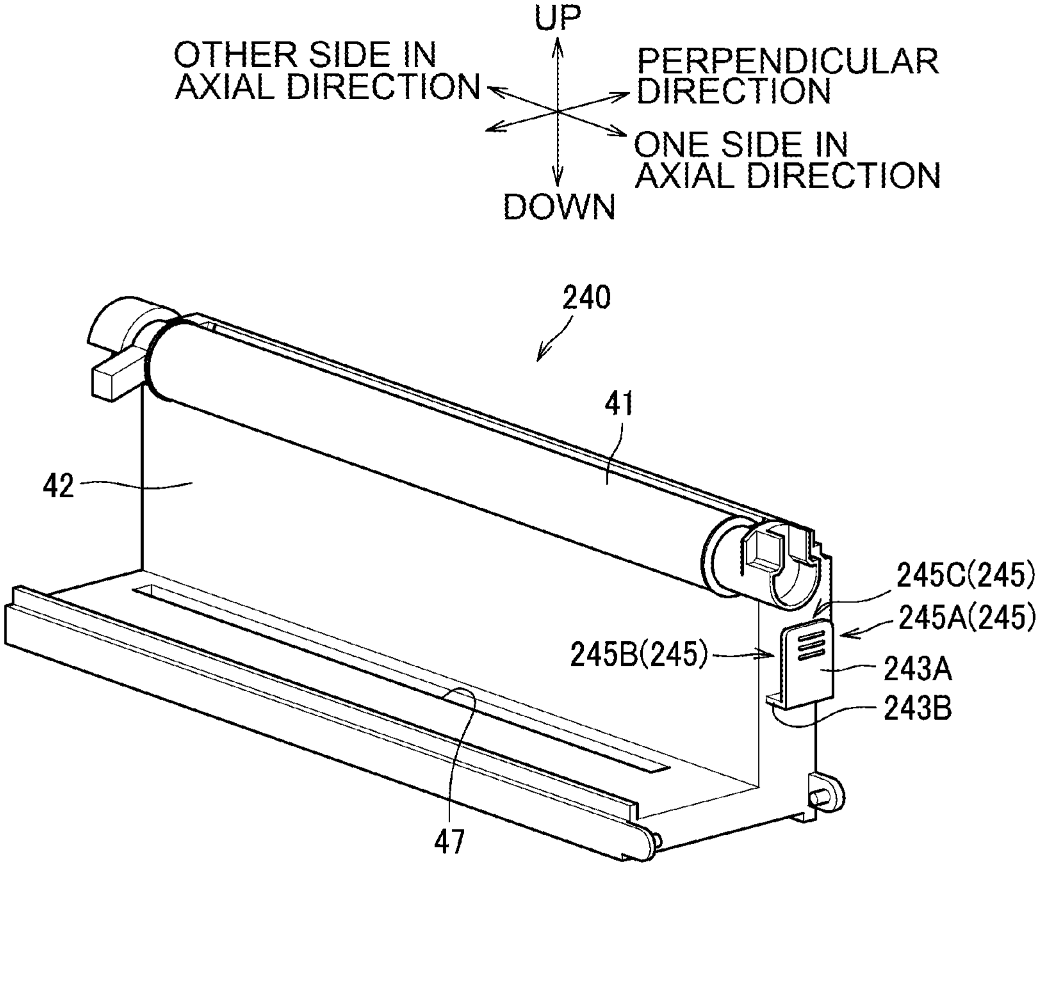
FIG. 10 is a perspective view illustrating a drum cartridge according to a third illustrative embodiment.

In the third illustrative embodiment, as illustrated in FIG. 10, a drum cartridge 240 includes a first handle 243A. The first handle 243A is spaced from an outer surface of a frame 42 by a certain distance in the axial direction. The drum cartridge 240 further includes a first connecting portion 243B. The first connecting portion 243B may connect between the outer surface of the frame 42 in the axial direction and one end of the first handle 243A in the up-down direction.

The first handle 243A has a first port 245. The first port 245 is defined between the outer surface of the frame 42 in the axial direction and the first handle 243A. In a state where the drum cartridge 240 is attached to the main body casing 2, the first port 245 opens at least upward. In a state where the drum cartridge 240 is attached to the main body casing 2, the first port 245 might not open downward. In the third illustrative embodiment, three sides of the first port 245 may open to respective sides. More specifically, for example, one of the sides of the first port 245 may open to the first axis X1 in the direction D1 (e.g., a first access 245A), another of the sides of the first port 245 may open to the second axis X2 in the direction D1 (e.g., a first access 245B), and another of the sides of the first port 245 may open upward (e.g., a first access 245C).

According to the drum cartridge 240 of the third illustrative embodiment, the first port 245 opens upward but not downward. Such a configuration may thus reduce or prevent the drum cartridge 240 from being lifted when a user hooks a finger on the first handle 243A. Consequently, such a configuration may reduce or prevent a photosensitive drum 41 and the intermediate transfer belt 63 from contacting each other.

In the illustrative embodiments, a held portion constituting the first handle or the second handle and a connecting portion each have a rectangular plate shape. Nevertheless, in other embodiments, for example, each of the held portion and the connecting portion might not necessarily have a rectangular shape or a plate-like shape.

In the above-described illustrative embodiments and modifications, the image forming apparatus 1 may be a color printer. Nevertheless, the disclosure is not limited to the color printer. In other embodiments, for example, the disclosure may be applied to other image forming apparatuses such as monochrome printers, copying machines, and multifunction devices.

The elements described in the respective illustrative embodiments or modifications may be combined to implement the disclosure.

What is claimed is:

1. A drum cartridge for use with a developing cartridge, the drum cartridge comprising:

a photosensitive drum rotatable about a first axis extending in an axial direction;

a frame having first and second ends spaced apart in the axial direction and rotatably supporting the photosensitive drum, and a first handle positioned at the first end of the frame, wherein the developing cartridge includes:

a developing roller rotatable about a second axis extending in the axial direction;

a developing casing configured to accommodate developer therein, and having first and second ends spaced apart in the axial direction and rotatably supporting the developing roller; and a second handle positioned at the first end of the developing casing, wherein the drum cartridge and the developing cartridge are configured to be received in a slot of an image forming apparatus extending from a first edge surface of the image forming apparatus in the axial direction toward a second edge surface, wherein the first handle extends from the second edge surface a first length in the axial direction and the second handle extends from the second edge surface a second length in the axial direction in a state where the drum cartridge and the developing cartridge are received in the slot, and wherein the first length is different than the second length.

2. The drum cartridge according to claim 1, wherein the second length is greater than the first length.

3. The drum cartridge according to claim 1, wherein the drum cartridge and the developing cartridge are configured to be inserted to and removed from the slot.

4. The drum cartridge according to claim 1, wherein the developing cartridge is configured to be attached to the image forming apparatus in a state where the drum cartridge is received in the slot.

5. A developing cartridge for use with a drum cartridge, the developing cartridge comprising:

a developing roller rotatable about a first axis extending in an axial direction;

a developing casing configured to accommodate developer therein, and having first and second ends spaced apart in the axial direction and rotatably supporting the developing roller; and a second handle positioned at the first end of the developing casing, wherein the drum cartridge includes:

a photosensitive drum rotatable about a second axis extending in the axial direction;

a frame having first and second ends spaced apart in the axial direction and rotatably supporting the photosensitive drum, and a first handle positioned at the first end of the frame, wherein the drum cartridge and the developing cartridge are configured to be received in a slot of an image forming apparatus extending from a first edge surface of the image forming apparatus in the axial direction toward a second edge surface, wherein the first handle extends from the second edge surface a first length in the axial direction and the second handle extends from the second edge surface a second length in the axial direction in a state where the drum cartridge and the developing cartridge are received in the slot, and wherein the first length is different than the second length.

6. The developing cartridge according to claim 5, wherein the second length is greater than the first length.

7. The developing cartridge according to claim 5, wherein the developing cartridge is configured to be attached to the image forming apparatus in a state where the drum cartridge is received in the slot.

8. The developing cartridge according to claim 5, wherein the drum cartridge and the developing cartridge are configured to be inserted to and removed from the slot.

9. An image forming apparatus, comprising:

a main casing including a first edge surface and a second edge surface opposite the first edge surface, and a slot extending from the first edge surface toward the second edge surface;

a drum cartridge including a photosensitive drum rotatable about a first axis extending in an axial direction, a frame having first and second ends spaced apart in the axial direction rotatably supporting the photosensitive drum, and a first handle positioned at the first end of the frame, wherein the drum cartridge is received in the slot in the axial direction;

a developing cartridge including a developing roller rotatable about a second axis extending in the axial direction, a developing casing configured to accommodate developer therein and having first and second ends spaced apart in the axial direction rotatably supporting the developing roller, and a second handle positioned at the first end of the developing casing, wherein the developing cartridge is received in the slot in the axial direction, wherein the first handle extends from the second edge surface a first length in the axial direction and the second handle extends from the second edge surface a second length in the axial direction, and wherein the first length is different than the second length.

10. The image forming apparatus of claim 9, wherein the developing cartridge is attached to the main casing.

11. The image forming apparatus of claim 9, wherein the drum cartridge is attached to the main casing.

12. The image forming apparatus of claim 9, wherein the second length is greater than the first length.

13. The image forming apparatus of claim 9, further comprising a cover at the first edge surface, the cover being movable between an open position in which the cover does not cover the slot and a closed position in which the cover covers the slot.

14. The image forming apparatus according to claim 9, wherein the drum cartridge and the developing cartridge are configured to be inserted to and removed from the slot.

* * * * *